March 29, 1927. 1,622,941
C. B. BUERGER
APPARATUS FOR CONDENSING OILS
Filed July 18, 1924 2 Sheets-Sheet 2
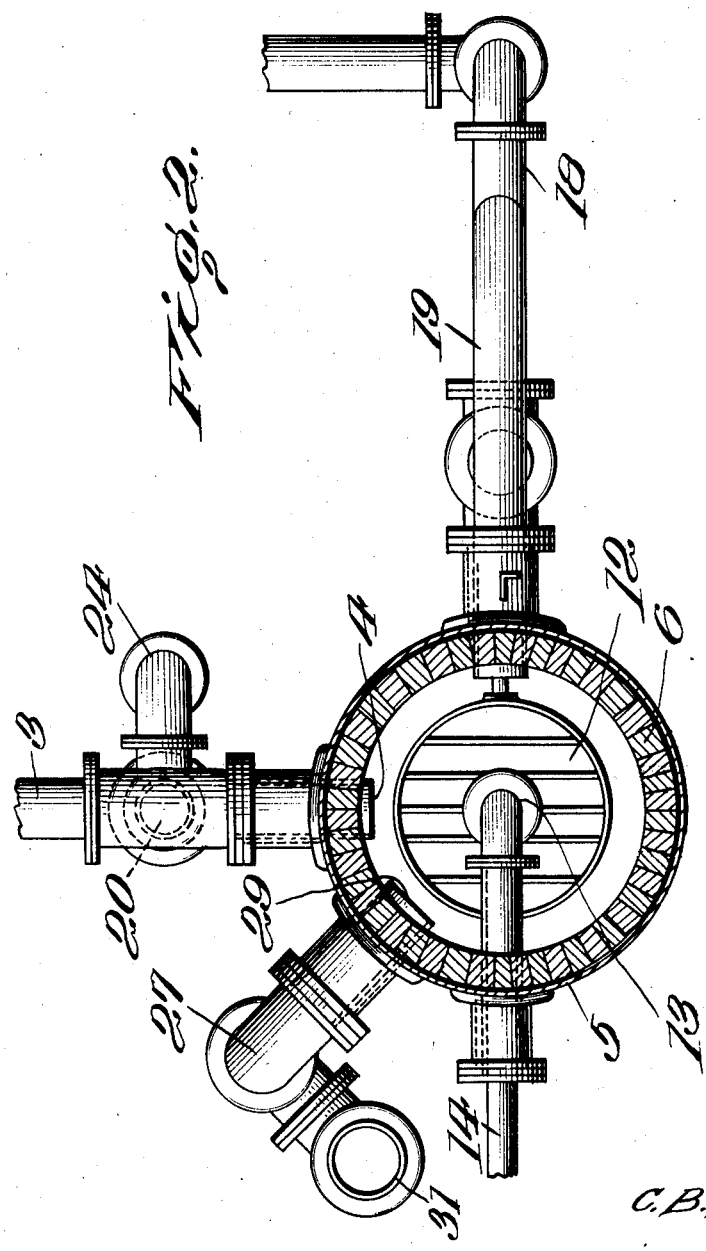

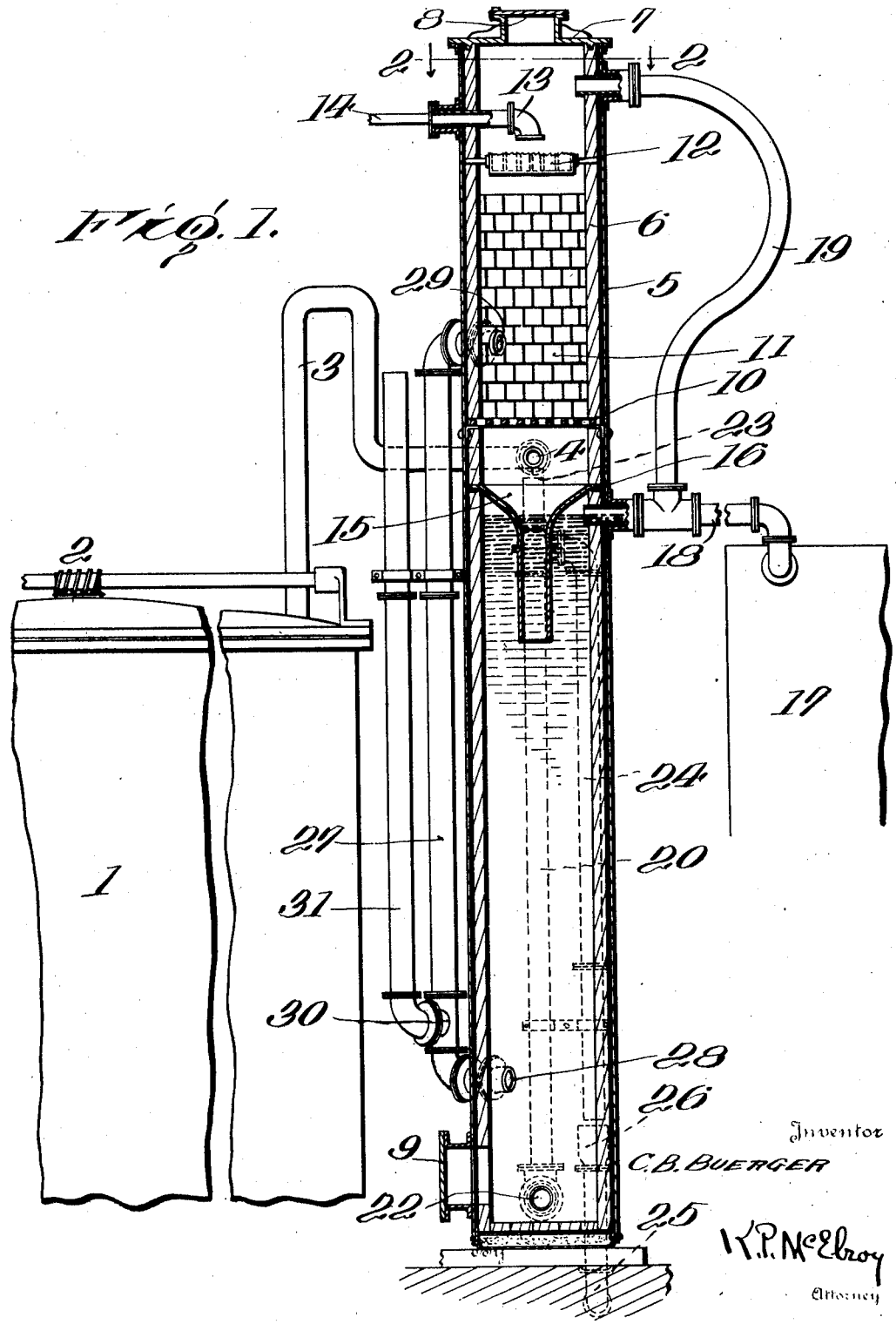

Patented Mar. 29, 1927.

1,622,941

UNITED STATES PATENT OFFICE.

CHARLES B. BUERGER, OF PITTSBURGH, PENNSYLVANIA, ASSIGNOR TO GULF REFINING COMPANY, OF PITTSBURGH, PENNSYLVANIA, A CORPORATION OF TEXAS.

APPARATUS FOR CONDENSING OILS.

Application filed July 18, 1924. Serial No. 726,759.

This invention relates to apparatus for condensing oils; and it comprises a condensing tower in communication with a still and containing water, means for delivering vapors from said still to the tower above the water therein, means for contacting the vapors with water delivered to the tower, means for delivering the mixture of water and condensed oil below the surfaces of the water in the tower, means for constantly withdrawing water from a low point in the tower, means for withdrawing floating oil from the tower and, advantageously, pressure equalizing means giving communication between various spaces in the tower; all as more fully hereinafter set forth and as claimed.

The present invention is particularly applicable to the condensation of vapors of hydrocarbons made by the aluminum chlorid distillation process. In accordance with aluminum chlorid distillation process high boiling hydrocarbons such as gas oil, solar oil, kerosene, or mixture of these, are heated in the presence of anhydrous aluminum chlorid to the boiling point of the mixture. Usually from 2 to 5 per cent of aluminum chlorid is used. Catalytic action ensues and the higher boiling hydrocarbons are converted into lower boiling hydrocarbon vapors which are sent to a condenser. Sometimes refluxing means are provided for refluxing to the still oils which condense below a certain temperature, say, 350° F. or thereabouts. The advantage of this is that aluminum chlorid vapors, or combinations of aluminum chlorid with a hydrocarbon will condense around such temperature, and will flow back to the still and not go forward to the final condenser. At other times depending upon the nature of the oil and the portions of aluminum chlorid used and the rate of distillation, the refluxing is not necessary. Sometimes there is a formation of hydrochloric acid gas which goes forward to the condenser and which results in corrosion thereof. Formation of hydrochloric acid gas is by no means a necessary concomitant of aluminum chlorid distillation and in many cases none is formed. But with some oils containing moisture or oxygenated components it may be produced; and in such cases it is desirable to keep it out of the condensers, which are ordinarily made of steel or iron. The present invention is particularly applicable to an aluminum chlorid distillation process in which evolution or formation of HCl takes place or may take place.

According to the operation of the apparatus of the present invention the vapors of the lower boiling hydrocarbons in the still are delivered to a condensing tower at a point below the top thereof and are brought into intimate contact with cooling water being advantageously caused to pass over obstructions such as tiles and the like against down flowing water; the amount of cooling water being so proportioned to the amount of vapor that substantial complete condensation of the vapors takes place. Instead of pasing the vapors against down flowing water in a scrubbing arrangement, a simple spray or rain of water may be employed. The mixture of water and condensed oil is caught in a suitable container and delivered below the top of a quiet column of water wherein and whereupon the oil separates as a floating layer. The condensed oil is withdrawn from this layer through cooling coils which may be smaller than the ordinary condensing coils for vapors. The column of water is maintained at substantially constant height by withdrawal below of a portion corresponding to the amount of water delivered, withdrawal being advantageously from a low point so that the top of the column of water is kept quiescent.

In the accompanying drawings showing one form of my invention,

Figure 1 is a vertical section through the condenser and a side elevation of a still—more or less diagrammatic; and Figure 2 is a horizontal section on an enlarged scale along line 2—2 of Figure 1.

In the drawing 1 indicates the still provided with shaft and worm drive 2 for the usual stirring apparatus and having the vapor outlet 3, all diagrammatically shown. The vapor outlet 3 of the still is connected to the tower (to be described) at 4 to deliver vapors of lower boiling hydrocarbon resulting from distillation of higher boiling hydrocarbon in the presence of anhydrous aluminum chlorid.

The condensing tower comprises a shell 5 of steel or the like interiorly lined with acid-proof bricks 6 of silica or the like and is closed at the top by cover 7 and cap 8. At the bottom the tower is also provided with manhole and cover 9. Supported on the grating 10 are a plurality of tile 11 and immediately above these is provided distributing box 12. Above the distributing box is the outlet 13 of the water pipe 14 arranged to deliver water into the distributing box whence it flows over and through the tile past the grating 10 into the lower portion of the tower against the rising vapors delivered from the still by means of the vapor line 3. The water is supplied in such amount as to condense and wash down the bulk of the vapors of the oil. Below the vapor line inlet is the funnel 15 supported by means of lugs 16 and depending below the normal level of the water in the tower. This funnel serves to collect the condensed oil and water and deliver them below the level of the water in the tower so as not to unduly disturb the water. The oil and water separate, the oil overlying the water and this oil is constantly delivered to cooling worms in the cooling box 17 by means of the pipe 18. In order that the pressure may be equalized between the outlet for the oil and the tower thereabove, equalizing pipe 19 is provided. Any vapors or non-condensable gases which escape past the water spray may enter this pipe and are delivered to the cooling coil. If there should be slight pressure in the other direction these vapors or gases would flow upwardly through equalizing pipe 19 and would be carried down by the water spray.

The volume of water in the tower is kept substantially constant by withdrawal through the pipe 20 in communication with the lower portion of the tower at 22. This pipe rises upwardly to a point past the normal water level in the tower and as shown terminates outside the tower at 23, and at a point approximately level with the vapor inlet, with open top to prevent vacuum formation. At a point slightly below the oil outlet 18, to outside the tower, a branch pipe 24 attached to the withdrawal pipe 20 carries water from such pipe to the conduit 25 leading to the sewer. Preferably between the conduit 25 and the pipe 24 is the funnel like enlargement 26, the end of the pipe 24 terminating just above or in it, to show character of waste.

If for any reason the flow of water should be obstructed or the water should not be carried away at a sufficiently rapid rate to compensate for the introduction of the water or if for any reason water should accumulate in the upper or vapor space of the tower, means are provided for immediately causing an overflow. The safety overflow arrangement comprises the pipe 27 in communication with the tower at a relatively low point at 28 below the level of the water therein, and in communication with the tower at a relatively high point 29 above the vapor inlet. In communication with this pipe 27 at 30 is the water leg 31 terminating at a level slightly below the connection 29. This safety overflow arrangement prevents flow of water to the still should the water overflow 20 and the line 18 become clogged. The vapor line 3 extends to a higher level than pipe 29.

It is believed the operation of the apparatus is obvious from the foregoing. In operation, the correct amount of water for condensing the vapors is introduced at 13. Oil and water separate in the tower and the inflow and outflow of water are so regulated that the oil level is maintained at the oil outlet 18 so that the scrubbed, washed and separated oil is constantly delivered to the cooling worm (not shown) in the cooling box 17 while water is constantly removed from a lower portion of the column by means of pipe 20 and pipe 24 connected with 20 at a high point. This connection ensures that the water will not all be drained from the tank. In other words the water cannot be removed by pipes 20 and 24 below the level of the point of connection of these two pipes. Uncondensed gases after passing up through the tile and water spray box pass to the cooling worm through the equalizer pipe 19. Vapors coming from the still are sealed against direct communication with the pipe 18 by means of the funnel 15.

Ordinarily the temperature of the oil and water at about the point of separation is from 150° to 200° F. All the hydrochloric acid is scrubbed out and the pure low boiling hydrocarbon is collected in the cooling worm which is thus protected from corrosion.

What I claim is:—

1. A condenser comprising a tower, means for supplying water thereto at a high point, means for withdrawing water therefrom at a low point, the withdrawal means being arranged to maintain a column of water in the tower, means for delivering vapors to be condensed to a point above the top of the column of water in the tower, means for withdrawing condensate from the top of the column and means for equalizing the pressure below and above the point of introduction of the vapors.

2. A condenser comprising a tower, means for supplying water thereto at a high point, means for withdrawing water therefrom at a low point, the withdrawal means being arranged to maintain a column of water in the tower, means for delivering vapors to be condensed to a point above the top of the column of water in the tower, means for withdrawing condensate from the top of the column, and means for equalizing the pressure below and above the point of introduction of the vapors said means comprising a pipe connected at one end to the condensate withdrawal means and at the other end to a higher point in the tower.

3. A condenser comprising a tower, means for maintaining a column of water substantially constant height therein, means for introducing vapors to be condensed above the top of the column of water and a safety overflow device comprising a pipe, one end being connected to the tower at a low point in the tower below the top of the column of water and the other end being connected at a high point in the tower above the top of the column of water, with a water leg on such pipe terminating at a point below the upper point of connection of the safety device to the tower.

4. A condenser comprising a tower, means for maintaining a column of water of substantially constant height therein, means for introducing vapors to be condensed above the top of the column of water and a safety overflow device comprising a pipe, one end being connected to the tower at a low point in the tower below the top of the column of water and the other end being connected at a high point in the tower above the top of the column of water, with a water leg on such pipe terminating at a point below the upper point of connection of the safety device to the tower and above the point of introduction of vapors to the tower.

5. A condenser comprising a tower, means for feeding water thereto at a high point, means for maintaining a column of water of substantially constant height in the tower and means dividing the tower into a vapor space and a liquid space said means comprising a funnel like arrangement having a leg extending below the top of the column of water, means for delivering vapors to the vapor space of the tower, whereby they are contacted with incoming water, and means for withdrawing condensate from the top of the column of water.

6. A condenser comprising a tower, means for feeding water thereto at a high point, means for maintaining a column of water of substantially constant height in the tower and means dividing the tower into a vapor space and a liquid space, said means comprising a funnel like arrangement having a leg extending below the top of the column of water, means for delivering vapors to the vapor space of the tower whereby they are contacted with incoming water, means for withdrawing condensate from the top of the column of water, and a safety overflow device comprising a pipe, one end being connected to the tower at a low point in the tower below the top of the column of water and the other end being connected at a high point in the tower above the top of the column of water with a water leg on such pipe terminating at a point below the upper point of connection of the safety device to the tower.

In testimony whereof, I have hereunto affixed my signature.

CHARLES B. BUERGER.